United States Patent Office 3,578,685
Patented May 11, 1971

3,578,685
3-(CYCLOPROPYLALKYL) - 2 - HYDROXY-1,4-NAPHTHOQUINONES AND THEIR PREPARATION
Sydney Archer, Bethlehem, N.Y., assignor to Sterling Drug Inc., New York, N.Y.
No Drawing. Filed Apr. 26, 1968, Ser. No. 724,618
Int. Cl. C07c 49/66
U.S. Cl. 260—396                                        9 Claims

ABSTRACT OF THE DISCLOSURE

3 - [cyclopropyl - $(CH_2)_n$] - 2 - hydroxy - 1,4 - naphthoquinones, where $n$ is an integer from 6 to 12 inclusive, having antimalarial properties, are prepared: (a) by heating 2 - hydroxy - 1,4 - naphthoquinone with a diacyl peroxide of the formula [ cyclopropyl - $(CH_2)_n$ - $CO]_2O_2$ where $n$ is 6 to 12 inclusive to produce said naphthoquinones where $n$ is 6 to 12, respectively; (b) by oxidizing under alkaline conditions 3 - [cyclopropyl - $(CH_2)_n$]-2-hydroxy - 1,4 - naphthoquinone where $n$ is 7 to 12 inclusive to produce the corresponding compound where $n$ is 6 to 11, respectively; and (c) by the steps of oxidizing the corresponding 2-[cyclopropyl-$(CH_2)_n$] - 1 - naphthol where $n$ is 6 to 12 inclusive to form 2 - [cyclopropyl-$(CH_2)_n$] - 1,4 - naphthoquinone, reacting the latter with a peroxide under alkaline conditions to form 2 - [cyclopropyl-$(CH_2)_n$] - 1,4 - naphthoquinone - 2,3 - oxide and hydrolyzing the 2,3 - oxide under acidic conditions to yield 2 - hydroxy - 3 - [cyclopropyl-$(CH_2)_n$] - 1,4 - naphthoquinone. Intermediates include compounds of the formula cyclopropyl - $(CH_2)_x$—COOH where $x$ is an integer from 5 to 12 inclusive.

This invention relates to compositions of matter known in the art of chemistry as 3 - substituted - 2 - hydroxy-1,4 - naphthoquinones, to intermediates therefore and to their preparation.

The invention sought to be patented, in one composition aspect, resides in the class of compounds which I designate 3 - [cyclopropyl - $(CH_2)_n$] - 2 - hydroxy - 1,4-naphthoquinones where $n$ is an integer from 6 to 12 inclusive. Accordingly, I depit the compounds as having cyclopropyl-$(CH_2)_n$ attached to the 3-position of 2 - hydroxy - 1,4 -naphthoquinone. The embodiments of this composition aspect of the invention possess the inherent implied use characteristics of exerting an antimalarial effect in mammals, as determined by standard evaluation procedures using plasmodial infections of rodents.

Without limiting the generality of the foregoing, illustrative and preferred embodiments of the 3 - [cyclopropyl-$(CH_2)_n$] - 2 - hydroxy - 1,4 - naphthoquinones are those of Formula I

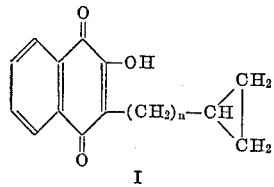

I where $n$ is an integer from 6 to 12 inclusive.

The invention sought to be patented, in other composition aspects, resides in compounds which I designate cyclopropyl - $(CH_2)_x$ - COOH where $x$ is an integer from 5 to 12 inclusive. The embodiments of this composition aspect of the invention are useful for the preparation of the foregoing 3 - [cyclopropyl - $(CH_2)_n$] - 2 - hydroxy - 1,4-naphthoquinones.

The invention sought to be patented, in a process aspect, resides in the process of heating 2 - hydroxy - 1,4 - naphthoquinone with the diacyl peroxide of the formula [cyclopropyl - $(CH_2)_n$ - $CO]_2O_2$ where $n$ is 6 to 12 inclusive to produce the compound of Formula I where $n$ is 6 to 12, respectively. Another process aspect of the invention sought to be patented comprises oxidizing the compound of Formula I where $n$ is 7 to 12 inclusive to produce the corresponding compound where $n$ is 6 to 11, respectively. This oxidation is carried out preferably by successively oxidizing said compound first with hydrogen peroxide and then with a cupric salt.

The invention sought to be patened, in another process aspect resides in the process which comprises the steps of oxidizing 2 - [cyclopropyl - $(CH_2)_n$] - 1 - naphthol where $n$ is 6 to 12 inclusive to form 2 - [cyclopropyl-$(CH_2)_n$] - 1,4 - naphthoquinone, reacting the latter with a peroxide under alkaline conditions to form 2 - [cyclopropyl - $(CH_2)_n$] - 1,4 - naphthoquinone - 2,3 - oxide, and hydrolyzing the 2,3 - oxide under acidic conditions to yield 2 - hydroxy - 3 - [cyclopropyl - $(CH_2)_n$] - 1,4 - naphthoquinone. Optionally, the above oxidizing step can be carried out stepwise as follows: reacting 2 - [cyclopropyl-$(CH_2)_n$] - naphthol with a diazotized salt of sulfanilic acid to form 2 - [cyclopropyl - $(CH_2)_n$] - 4 - (4 - sulfophenyldiazo) - 1 - naphthol, reducing the diazo compound to form 4 - amino - 2 - [cyclopropyl - $(CH_2)_n$] - 1 - naphthol, oxidizing said 4-amino compound to form 2-[cyclopropyl - $(CH_2)_n$] - 1,4 - dihydro - 4 - imino - 1 - oxonaphthalene, and hydrolyzing said 4-imino compound under acidic conditions to form a 2 - [cyclopropyl - $(CH_2)_n$]-1,4-naphthoquinone.

The manner and process of making and using the invention will now be generally described so as to enable a person skilled in the art of medicinal chemistry to make and use the same, as follows:

PREPARATION OF INTERMEDIATES

The preparation of the intermediate cyclopropylalkanoic acids of the formula cyclopropyl - $(CH_2)_x$—COOH is carried out by various generally known methods as follows: 2 - (cyclopropylcarbonyl)cyclohexanone is prepared by reacting cyclopropanecarboxylic acid chloride with 1-morpholinocyclohexene by mixing said reactants in the presence of an acid-acceptor, e.g., triethylamine, preferably in a suitable inert solvent, e.g., chloroform, dioxane, benzene, while maintaining the temperature of the reaction mixture preferably between about 25–40° C. and then heating the reaction mixture containing 2 - (cyclopropylcarbonyl) - 1 - morpholinocyclohexene with an aqueous solution containing a mineral acid, e.g., hydrochloric acid, to produce 2- (cyclopropylcarbonyl)cyclohexanone. Conversion of the latter to 7 - cyclopropyl - 7 - ketoheptanoic acid is effected by heating the cyclohexanone in an aqueous alkaline medium, e.g., aqueous potassium or sodium hydroxide solution. The keto acid is then reduced to the corresponding 7 - cyclopropylheptanoic acid by heating it in a suitable solvent, e.g., diethylene glycol, with hydrazine hydrate at about 110–140° C. and subsequent hydrolysis of the resulting hydrazone by heating it in the same solvent at about 160–250° C., preferably at about 180–225° C. Alternatively, but less preferred, this reduction can be run using zinc amalgam and concentrated hydrochloric acid. 7 - cyclopropylheptanoyl chloride is readily obtained by heating a solution of 7 - cyclopropylheptanoic acid in suitable solvent, e.g., chloroform, with thionyl chloride. Other compounds which were prepared by the above conventional procedures by using the appropriate reactants are: 2- (7 - cyclopropylheptanoyl) - cyclohexanone from 7 - cyclopropylheptanoyl chloride and 1 - morpholinocyclohexene; 2 - (7 - cyclopropylheptanoyl)cyclopentanone from 7 - cyclopropylheptanoyl chloride and 1-morpholinocyclopentene; 13 - cyclopropyl - 7 - ketotridecanoic acid from 2 - ( 7 - cyclopropyl heptanoyl)cyclohexanone; 12 - cyclopropyl - 6 - ketododecanoic acid from 2 - (7-cyclopropylheptanoyl)cyclopentanone; 13 - cyclopropyltridecanoic acid from 13 - cyclopropyl - 7 - ketotridecanoic acid; 12 - cyclopropyldodecanoic acid from 12 - cyclopropyl - 6 - ketododecanoic acid; 13 - cyclopropyltridecanoyl chloride from 13 - cyclopropyltridecanoic acid; 12-cyclopropyldodecanoyl chloride from 12 - cyclopropyldodecanoic acid. The above acid chlorides, e.g., 7 - cyclopropylheptanoyl chloride, 13 - cyclopropyltridecanoyl chloride and 12 - cyclopropyldodecanoyl chloride, are converted into the corresponding diacyl peroxides i.e., bis( 7 - cyclopropylheptanoyl) peroxide, bis (13 - cyclopropyltridecanoyl) peroxide and bis(12-cyclopropyldodecanoyl) peroxide, respectively, by treatment of an ether solution of the acid chloride kept at about −5° to 0° C. with hydrogen peroxide and pyridine. The preparations of these compounds are given hereinbelow.

Other intermediate ω - cyclopropylalkanoic acids of the formula cyclopropyl - $(CH_2)_x$-COOH where $x$ is an integer from 5 to 12 inclusive are prepared by various generally known methods as illustrated further hereinbelow in the examples, e.g., A–3, –7, –11, –15, –18, –21, –24 and –29.

The reaction of cyclopropyl-$(CH_2)_x$-COOH where $x$ is 5 to 11 inclusive with 1-naphthol to form 2 - [cyclopropyl-$(CH_2)_x$-C(=O)]-1 - naphthol is effected by heating the reactants in the presence of a condensing agent, e.g., $BF_3$ or $ZnCl_2$, preferably in boron trifluoride etherate at about 95° C. Heating temperatures in the range of about 80 to 120° C. can be used. The reduction of 2 - [cyclopropyl-$(CH_2)_x$=C(=O)] - 1 - naphthol were $x$ is 5 to 11 inclusive is carried out by heating it with amalgamated zinc and concentrated hydrochloric acid, preferably refluxing in a suitable solvent, e.g., methanol, ethanol, acetic acid, etc., to yield 2 - [cyclopropyl - $(CH_2)_n$] - 1 - naphthol where $n$ is 6 to 12 inclusive.

PREPARATION OF FINAL PRODUCTS

The 3 - [cyclopropyl - $(CH_2)_n$] - 2 - hydroxy - 1,4-naphthoquinone where $n$ is 6 to 12 is prepared by heating 2 - hydroxy - 1,4 - naphthoquinone with the diacyl peroxide of the formula [cyclopropyl - $(CH_2)_n$-CO]$_2$O$_2$ where $n$ is 6 to 12, respectively. The reaction is carried out preferably using a solvent inert to the reaction conditions, e.g., a lower-alkanoic acid, preferably acetic acid, at a temperature in the range of 75–150° C., preferably between about 90–110° C. The conversion of the 3-[cyclopropyl - $(CH_2)_n$] - 2 - hydroxy - 1,4 - naphthoquinone where $n$ is 7 to 12 inclusive to the corresponding compound where $n$ is 6 to 11, respectively, is carried out by oxidation under alkaline conditions, preferably by successive oxidations under alkaline conditions first using hydrogen peroxide and then a cupric salt, preferably a salt of strong inorganic acid e.g., cupric sulfate, cupric chloride, cupric nitrate. The oxidations are carried out preferably in an aqueous medium, e.g., water-dioxane mixtures, using sodium carbonate, potassium carbonate, sodium hydroxide, potassium hydroxide or the like, to provide the alkaline conditions. The oxidation with hydrogen peroxide is conducted preferably by warming the reactants, up to about 70° C., under an inert atmosphere, e.g., nitrogen. The excess hydrogen peroxide is preferably removed by chilling the reaction mixture, acidifying it and passing sulfur dioxide through the chilled mixture. The mixture is again made alkaline and then the oxidation with the cupric salt is conducted, preferably by heating the reaction mixture at about 75–125° C., with a preferred range of about 90–10° C.; optionally, this oxidation can be run at a lower temperature, i.e., down to about room temperature, although a longer time is required for completion of the reaction. Variations in the oxidative conversions of the 3 - [cyclopropyl-$(CH_2)_n$]-1 - 2-hydroxy-1,4-naphthoquinone where $n$ is 7 to 12 inclusive to the corresponding compound where $n$ is 6 to 11, respectively, can be made, for example: other water-miscible organic solvents can be used instead of dioxane, e.g., diethylformamide, tetrahydrofuran; potassium ferricyanide can be ued in place of the cupric salt; the oxidation can be effected directly in one step, although with a decrease in yield, by using a strong oxidizing agent, e.g., potassium permanganate, sodium dichromate, also under alkaline conditions.

2 - [cyclopropyl - $(CH_2)_n$] - 1 - naphthol wherein $n$ is 6 to 12 inclusive is oxidized to 2 - [cyclopropyl-$(CH_2)_n$]-1,4 - naphthoquinone by heating at about 50–80° C., preferably to about 60–70° C., 2 - [cyclopropyl - $(CH_2)_n$]-1-naphthol with chromium trioxide, i.e., $CrO_3$, in a suitable solvent, e.g., acetic acid containing about 5 to 50% water. The reaction of 2 - [cyclopropyl - $(CH_2)_n$] - 1,4-naphthoquinone to form its 2,3 - oxide is carried out by reacting the former compound with a peroxide, e.g., hydrogen peroxide under alkaline conditions, e.g., aqueous potassium or sodium hydroxide, preferably using a suitable organic solvent, e.g., tertiary-butyl alcohol, dioxane. The slightly exothermic reaction is run without any external heating. The 2,3-oxide is hydrolyzed under acidic conditions to produce 3 - [cyclopropyl - $(CH_2)_n$] - 2 - hydroxy - 1,4 - naphthoquinone, the hydrolysis preferably being carried out by dissolving the oxide in concentrated sulfuric acid, adding this solution to a mixture of water (or ice) and acetic acid and then heating the reaction mixture on a steam bath.

The stepwise process of oxidizing 2-[cyclopropyl-$(CH_2)_n$] - 1 - naphthol to 2-[cyclopropyl-$(CH_2)_n$]-1,4-naphthoquinone is carried out by first reacting 2-[cyclopropyl-$(CH_2)_n$]-1-naphthol with a diazotized salt of sulfanilic acid to form 2-[cyclopropyl-$(CH_2)_n$]-4-(4-sulfophenyldiazo)-1-naphthol. The diazo compound is reduced to the corresponding 4-amino compound, preferably using sodium hydrosulfite ($Na_2S_2O_4$) in aqueous methanol solution; the reduction also can be run using zinc and hydrochloric acid. The 4-amino compound in a suitable solvent, e.g., acetic acid, is oxidized to 2-[cyclopropyl-$(CH_2)_n$]-1,4-dihydro-4-imino-1-oxonaphthalene using chromium trioxide in aqueous acetic acid, preferably in the presence of sulfuric acid and then hydrolyzing the 4-imino sulfate salt in situ by heating the acidic reaction mixture at about 60 to 90° C. to yield 2-[cyclopropyl-$(CH_2)_n$]-1,4-naphthoquinone. Alternatively by using no sulfuric acid during the oxidation, the 4-imino compound can be isolated as its chromate salt which is then hydrolyzed under acidic conditions, preferably by treating a hot aqueous acetic acid solution of the imino salt with a mineral acid, e.g., hydrochloric acid or sulfuric acid.

The best mode contemplated for carrying out the invention will now be set forth, as follows:

(A) INTERMEDIATES (1) 2-(cyclopropylcarbonyl)cyclohexanone: To a solution containing 167.3 g. of 1-morpholino cyclohexene and 110 g. of triethylamine in 1000 ml. of chloroform heated to 35° C. was added over a period of one hour a solution of 104.5 g. of cyclopropanecarboxylic acid chloride in 400 ml. of chloroform. The reaction mixture was then allowed to stand at room temperature (25–30° C.) for sixteen hours and was then treated with a solution containing 125 ml. of concentrated hydrochloric acid and 375 ml. of water. The resulting mixture was refluxed for three hours, cooled and the two layers separated. The chloroform layer was washed twice with water, dried over anhydrous calcium sulfate, concentrated in vacuo and distilled to yield 93.4 of 2-(cyclopropylcarbonyl)cyclohexanone, 128–132° C. at 11 mm.

(2) 7-cyclopropyl-7-ketoheptanoic acid: To a boiling solution containing 60 ml. of 35% aqueous sodium hydroxide solution in 300 ml. of water was added 93.4 g. of 2-(cyclopropylcarbonyl)cyclohexanone. The mixture was boiled for about three minutes or until homogeneous, cooled, made acidic with concentrated hydrochloric acid, saturated with sodium chloride and extracted with ether. The extract was dried over anhydrous calcium sulfate and concentrated in vacuo to remove the ether. The residue was crystallized from n-hexane and then recrystallized from isopropyl acetate-n-pentane to yield 62 g. of 7-cyclopropyl-7-ketoheptanoic acid, M.P. 75–77° C.

(3) 7-cyclopropylheptanoic acid: A mixture containing 61.3 g. of 7-cyclopropyl-7-ketoheptanoic acid, 59 ml. of 85% hydrazine hydrate and 400 ml. of diethylene glycol was heated at 120–130° for two and one-half hours. The reaction mixture was then heated in vacuo at a maximum temperature of 120° C. to remove the excess hydrazine hydrate and water. To the residue was added 95 g. of potassium hydroxide and the mixture was slowly heated to 220° C., kept at that temperature for about ninety minutes and then poured onto ice. The mixture was acidified with concentrated hydrochloric acid and extracted with chloroform. The extract was dried over anhydrous calcium sulfate, treated with decolorizing charcoal and filtered. The filtrate was concentrated in vacuo to remove the solvent then distilled to yield 49.5 g. of 7-cyclopropylheptanoic acid, B.P. 96–105° C. at 0.05 mm.

(4) 7-cyclopropylheptanoyl chloride: To a refluxing solution containing 49.5 g. of 7-cyclopropylheptanoic acid dissolved in 100 ml. of chloroform was added 32 ml. of thionyl chloride over a period of forty-five minutes and the resulting mixture was then refluxed for an additional thirty minutes. An additional 6 ml. of thionyl chloride was added and refluxing continued for two hours. The solvent was removed by distillation in vacuo and the residue was distilled under high vacuum to yield 49.8 of 7-cyclopropylheptanoyl chloride, B.P. 64–66° C. at 0.05 mm.

(5) 2-(7-cyclopropylheptanoyl)cyclohexanone: To a solution containing 48.0 g. of 1-morpholinocyclohexene and 31.5 g. of triethylamine in 360 ml. of chloroform and heated to 35° C. was added over a period of ninety minutes a solution containing 49.5 g. of 7-cyclopropylheptanoyl chloride and 135 ml. of chloroform. The reaction mixture was allowed to cool to room temperature. After standing at room temperature overnight, it was treated with a mixture of 100 ml. of water and 40 ml. of concentrated hydrochloric acid, refluxed with stirring for five hours and cooled. The layers were separated and the chloroform layer extracted five times with water. The combined water layers were treated with 35% aqueous sodium hydroxide solution to a pH of 5.5 and extracted twice with chloroform. The combined chloroform extracts were dried over anhydrous magnesium sulfate, concentrated in vacuo to remove the chloroform and distilled to yield 43.7 g. of 2-(7-cyclopropylheptanoyl)cyclohexanone, B.P. 135–143° C. at 0.1 mm.

(6) 13-cyclopropyl-7-ketotridecanoic acid: To a boiling solution containing 14 g. of potassium hydroxide in 250 ml. of water was added 43.7 g. of 2-(7-cyclopropylheptanoyl)cyclohexanone and the resulting mixture was boiled for ten minutes and worked-up as in Example A–2. There was thus obtained 30.5 g. of 13-cyclopropyl-7-ketotridecanoic acid, M.P. 67–69° C.

(7) 13-cyclopropyltridecanoic acid: A mixture containing 29.0 g. of 13-cyclopropyl-7-ketotridecanoic acid, 175 ml. of ethylene glycol and 25 ml. of 85% hydrazine hydrate was heated slowly to 125° C. and then kept at 120–130° C. for three hours. The reaction mixture was heated in vacuo at a temperature up to 123° C. to remove the excess hydrazine hydrate and water. The residue was treated with 30 g. of potassium hydroxide and the mixture slowly heated to 180° C. Heating was continued until the evolution of nitrogen ceased. The reaction mixture was then poured onto ice, the resulting mixture acidified with concentrated hydrochloric acid, and the precipitated acid collected. The acid was dissolved in chloroform, the chloroform solution dried over anhydrous calcium sulfate, also using decolorizing charcoal, and then concentrated in vacuo to remove the chloroform. The residue was recrystallized from n-hexane-n-pentane to yield 24.0 g. of 13-cyclopropyltridecanoic acid, M.P. 57–59° C.

(8) 13-cyclopropyltridecanoyl chloride: To 20 ml. of thionyl chloride under reflux was added slowly 23.0 g. of 13-cyclopropyltridecanoic acid dissolved in 50 ml. of chloroform. Refluxing was continued for thirty minutes followed by the addition of 7 ml. of thionyl chloride and refluxing continued for another two hours. The reaction mixture was distilled in vacuo to remove the solvent and to leave the 13-cyclopropyltridecanoyl chloride (used in Example B–1).

(9) 2 - (7-cycloheptanoyl)cyclopentanone, B.P. 109–119° C. at 0.2 mm., 106.5 g., was prepared as in Example A–1 using 115.0 g. of 7-cyclopropylheptanoyl chloride in 185 ml. of chloroform, 95.3 g. of 1 - morpholinocyclopentene and 68.5 g. of triethylamine in 360 ml. of chloroform.

(10) 12 - cyclopropyl - 6 - ketododecanoic acid, M.P. 79–81° C., 90.0 g., was prepared following the procedure described in A–2 using 105.5 g. of 2-(7-cyclopropylheptanoyl)cyclopentanone, 75.0 g. of 85% potassium hydroxide pellets and 1,200 ml. of water.

(11) 12-cyclopropyldodecanoic acid, M.P. 58–59° C., 81.5 g., was prepared following the procedure described in Example A–3 using 89.0 g. of 12-cyclopropyl-6-ketododecanoic acid, 575 ml. of diethylene glycol and 75 ml. of hydrazine hydrate. The recrystallizing solvent was methanol.

(12) 12 - cyclopropyldodecanoyl chloride, B.P. 117–120° C. at 0.2 mm., 29.8 g., was prepared following the procedure described in Example A–4 using 77.5 g. of 12-cyclopropyldodecanoic acid in 100 ml. of chloroform and 114 g. of thionyl chloride.

(13) 2 - (cyclopropylcarbonyl)cycloheptanone is prepared following the procedure described in Example A–1 using a molar equivalent quantity of 1-morpholinecycloheptene in place of 1-morpholinocyclohexene.

(14) 8-cyclopropyl - 8 - ketooctanoic acid is prepared following the procedure described in Example A–2 using a molar equivalent quantity of 2-(cyclopropylcarbonyl)cycloheptanone in place of 2-(cyclopropylcarbonyl)cyclohexanone.

(15) 8-cyclopropyloctanoic acid is obtained following the procedure described in Example A–3 using a molar equivalent quantity of 8-cyclopropyl-8-ketooctanoic acid in place of 7-cyclopropyl-7-ketoheptanoic acid.

(16) 8-cyclopropyloctanol: A suspension of 13 g. of lithium aluminum hydride in 125 ml. of tetrahydrofuran is stirred until most of the hydride dissolves. To this mixture is added over a period of ninety minutes a solution of 18.9 g. of 8-cyclopropyloctanoic acid and 100 ml. of tetrahydrofuran. The mixture is refluxed for twenty hours and then cooled in an ice bath. To the reaction mixture is carefully added 5 ml. of 10% aqueous sodium hydroxide solution. The mixture is placed on a steam bath and to it is added slowly an additional 12 ml. of 10% aqueous sodium hydroxide solution. The mixture is refluxed for ten minutes and then treated with an additional 20 g. of powdered potassium hydroxide and filtered, washing the filter-cake with tetrahydrofuran. The combined filtrate and washings are concentrated to remove the tetrahydrofuran thereby yielding 8-cyclopropyloctanol.

(17) 8-cyclopropyloctyl bromide is obtained as follows: A mixture containing 14.4 g. of 8-cyclopropyloctanol, 50 g. of 48% hydrobromic acid and 7 ml. of concentrated sulfuric acid is refluxed for four hours, cooled and extracted with ether. The ether extract is washed with water, dried over anhydrous magnesium sulfate, concentraetd in vacuo to remove the ether and distilled to yield 8-cyclopropyloctyl bromide.

(18) 10-cyclopropyldecanoic acid: To 200 ml. of absolute ethanol is added 1.8 g. of sodium and the mixture is refluxed with stirring until a solution is obtained. To the solution is added 21.9 g. of diethyl malonate followed by 17.7 g. of 8-cyclopropyloctyl bromide and the resulting mixture refluxed for twenty hours. To the cooled reaction mixture is added a solution of 22 g. of potassium hydroxide in 23 ml. of water and the ethanol is distilled off while adding water from time to time. The mixture is heated on a steam bath for four hours, cooled, poured onto ice and acidified with concentrated hydrochloric acid. The acidic mixture is extracted with ether. The ether extract is dried over anhydrous magnesium sulfate and heated in vacuo to remove the ether. The residue is heated with stirring to about 145 °C. whereupon there is vigorous evolution of carbon dioxide. There thus remains the 10-cyclopropyldecanoic acid.

(19) 7-cyclopropylheptanol is prepared as in Example A–16 using a molar equivalent quantity of 7-cyclopropylheptanoic acid in place of 8-cyclopropyloctanoic acid.

(20) 7-cyclopropylheptyl bromide is prepared as in Example A–17 using a molar equivalent quantity of 7-cyclopropylheptanol in place of 8-cyclopropyloctanol.

(21) 9-cyclopropylnonanoic acid is prepared as in Example A–18 using a molar equivalent quantity of 7-cyclopropylheptyl bromide in place of 8-cyclopropyloctyl bromide.

(22) 9-cyclopropylnonanol is prepared as in Example A–16 using a molar equivalent quantity of 9-cyclopropylnonanoic acid in place of 8-cyclopropyloctanoic acid.

(23) 9-cyclopropylnonyl bromide is prepared as in Example A–17 using a molar equivalent quantity of 9-cyclopropylnonanol in place of 8-cyclopropyloctanol.

(24) 11-cyclopropylundecanoic acid is prepared as in Example A–18 using a molar equivalent quantity of 9-cyclopropylnonyl bromide in place of 8-cyclopropyloctyl bromide.

(25) 2-(12-cyclopropyldodecanoyl)-1-naphthol is prepared as follows: A solution of 46.7 g. of 12-cyclopropyldodecanoic acid and 29.3 g. of α-naphthol in 125 ml. of boron trifluoride etherate (47%) is stirred and heated on a steam bath for one hour. A total of 200 ml. of water is added carefully but fairly rapidly while a vigorous evolution of ether ensued. The mixture is cooled and an additional 250 ml. of water is added. The product is extracted with chloroform. The extract is washed with water, dried over anhydrous calcium chloride while treating with decolorizing charcoal, filtered and concentrated in vacuo. The residue is slurried in 300 ml. of cold methanol, collected, and dried in vacuo at 30° C. to yield 2-(12-cyclopropyldodecanoyl)-1-naphthol.

Following the above-described procedure of Example A–25 but using a molar equivalent quantity of the appropriate cyclopropylalkanoic acid in place of 12-cyclopropyldodecanoic acid, the following compounds are obtained: 2 - (11-cyclopropylundecanoyl)-1-naphthol using 11-cyclopropylundecanoic acid, 2 - (10-cyclopropyldecanoyl)-1-naphthol using 10-cyclopropyldecanoic acid; 2-(9-cyclopropylnonanoyl)-1-naphthol using 9 - cyclopropylnonanoic acid; 2-(8-cyclopropyloctanoyl)-1-naphthol using 8-cyclopropyloctanoic acid; 2-(7-cyclopropylheptanoyl)-1-naphthol using 7-cyclopropylheptanoic acid; and, 2-(6-cyclopropylhexanoyl) - 1 - naphthol using 6-cyclopropylhexanoic acid.

(26) 2-(12-cyclopropyldodecyl) - 1 - naphthol is prepared as follows: A mixture of 25.3 g. of 2-(12-cyclopropyldodecanoyl)-1-naphthol, 100 g. of amalgamated zinc, 500 ml. of methanol and 100 ml. of concentrated hydrochloric acid is refluxed while stirring vigorously for one hour. An additional 100 ml. of concentrated hydrochloric acid is added and refluxing continued for two hours. The volume is reduced to about 250 ml. in vacuo and then diluted with 200 ml. of water. The product is is extracted with ether. The extract is dried over anhydrous calcium chloride and concentrated in vacuo to remove the ether. The residue is crystallized from n-pentane by cooling in a bath of acetone containing solid carbon dioxide. The precipitate is collected to yield 2-(12-cyclopropyldodecyl)-1-naphthol.

Following the above-described procedure for the preparation of 2-(12-cyclopropyldodecyl) - 1-naphthol but using molar equivalent quantity of the appropriate 2-(cyclopropylalkanoyl) - 1 - naphthol in place of 2-(12-cyclopropyldodecanoyl)-1-naphthol, the following compounds are obtained: 2 - (11 - cyclopropylundecyl)-1-naphthol using 2-(11-cyclopropylundecanoyl) - 1-naphthol, 2-(10 - cyclopropyldecyl)-1-naphthol using 2-(10-cyclopropyldecanoyl) - 1-naphthol; 2 - (9 - cyclopropylnonyl) - 1 - naphthol using 2-(9-cyclopropylnonanoyl)-1-naphthol; 2-(8-cyclopropyloctyl)-1-naphthol using a 2-(8-cyclopropyloctanoyl)-1 - naphthol; 2-(7-cyclopropylheptyl)-1-naphthol using 2-(7-cyclopropylheptanoyl)-1-naphthol; and, 2-(6-cyclopropylhexyl)-1-naphthol using 2-(6-cyclopropylhexanoyl)-1-naphthol.

(27) 2 - (cyclopropylcarbonyl)cyclopentanone is prepared as in Example A–1 using a molar equivalent quantity of 1-morpholinocyclopentene in place of 1-morpholinocyclohexene.

(28) 6 - cyclopropyl - 6-ketohexanoic acid is prepared as in Example A–2 using a molar equivalent quantity of 2 - (cyclopropylcarbonyl)cyclopentanone in place of 2-(cyclopropylcarbonyl)cyclohexanone.

(29) 6 - cyclopropylhexanoic acid is prepared as in Example A–3 using a molar equivalent quantity of 6-cyclopropyl - 6 - ketohexanoic acid in place of 7-cyclopropyl-7-ketoheptanoic acid.

(30) 6-cyclopropylhexanoyl chloride is prepared in Example A–4 using a molar equivalent quantity of 6-cyclopropylhexanoic acid in place of 7 - cyclopropylheptanoic acid.

(B) FINAL PRODUCTS (1) 3 - (12 - cyclopropyldodecyl) - 2-hydroxy-1,4-naphthoquinone: The 13 - cyclopropyltridecanoyl chloride prepared in Example A–8 was dissolved in 250 ml. of ether, the ether solution cooled to about −5° C. and to the stirred solution was added 25.4 g. of 90% hydrogen peroxide in portions keeping the temperature below 0° C. Next, 9.9 ml. of pyridine was added dropwise over a period of about twenty minutes and the mixture was stirred for an hour at a temperature range between 0 and 15° C. The mixture was washed successively with water, 5% aqueous sodium bicarbonate solution, water, dilute aqueous hydrochloric acid and water. The ether solution containing bis(13 - cyclopropyltridecanoyl) peroxide was then dried over anhydrous calcium sulfate and then added dropwise with stirring over a period of one hour to a solution of 14 g. of 2-hydroxy-1,4-naphthoquinone in 100 ml. of acetic acid at about 94° C. The reaction mixture was then stirred for fifteen minutes at the same temperature and concentrated in vacuo to remove the solvents. The residue was dissolved in ether and the ether solution was washed well with dilute aqueous sodium bicarbonate solution, dried over anhydrous calicum sulfate and concentrated in vacuo to remove the ether. The residue was recrystallized from n-pentane then recrystallized twice from methanol to yield 1.7 g. of 3-(12-cyclopropyldodecyl)-2-hydroxy - 1,4 - naphthoquinone, M.P. 80–82° C.

Other 3-(cyclopropylalkyl) - 2 - hydroxy-4-naphthoquinones are prepared by following the procedure described in Example B–1 using a molar equivalent quantity of the appropriate corresponding cyclopropylalkanoyl chloride in place of 13-cyclopropyltridecanoyl chloride as follows: 3-(10-cyclopropyldecyl)-2-hydroxy-1,4 - naphthoquinone using 11 - cyclopropylundecanoyl chloride; 3-(9-cyclopropylnonyl)-2-hydroxy-1,4-naphthoquinone using 10 - cyclopropyldecanoyl chloride; 3-(8-cyclopropyloctyl)-2-hydroxy-1,4 - naphthoquinone using 9-cyclopropylnonanoyl chloride; and, 3-(7-cyclopropylheptyl)-2-hydroxy - 1,4 - naphthoquinone using 8-cyclopropyloctanoyl chloride.

(2) 3 - (11 - cyclopropylundecyl) - 2 - hydroxy-1,4- naphthoquinone: To a solution containing 29.8 g. of 12-cyclopropyldodecanoyl chloride in 175 ml. of ether cooled to 0° C. was added over a period of five minutes 59 g. of 50% hydrogen peroxide. The reaction mixture was stirred for three minutes and then treated with 10.9 g. of pyridine maintaining the temperature while stirring for a period of about one hour. The ether layer was separated and washed successively with dilute aqueous hydrochloric acid, 5% aqueous sodium bicarbonate solution and water. The ether solution was then dried over anhydrous calcium sulfate and concentrated in vacuo to a voume of about 150 ml. This solution containing bis(12-cyclopropyldodecanoyl) peroxide was then added to a solution of 12.1 g. of 2-hydroxy-1,4-naphthoquinone in 213 ml. of acetic acid at 95–100° C. over a period of three hours. Heating was continued for an additional four hours. The reaction mixture was then concentrated in vacuo and the residue treated with 200 ml. of ether. The insoluble excess of 2-hydroxy-1,4-naphthoquinone was filtered off. The filtrate was washed well with 5% aqueous sodium bicarbonate solution, dried over anhydrous calcium sulfate and concentrated in vacuo to remove the solvent. The residue was crystallized from methanol and then recrystallized, using decolorizing charcoal from n-hexane-n-pentane to yield 2.6 g. of 3-(11-cyclopropylundecyl) - 2 - hydroxy - 1,4 - naphthoquinone M.P. 83–84° C.

(3) 3 - (10 - cyclopropyldecyl)-2-hydroxy-1,4-naphthoquinone: A mixture containing 1.8 g. of 3-(11-cyclopropylundecyl) - 2 - hydroxy-1,4-naphthoquinone in 30 ml. of dioxane and 30 ml. of water containing 0.57 g. of sodium carbonate was heated at 60–70° C. 1.0 ml. of 30% hydrogen peroxide under and atmosphere of nitrogen until the solution was colorless. The reaction mixture was cooled in an ice bath and treated with 1.0 ml. of concentrated hydrochloric acid and 6.0 ml. of water saturated with sulfur dioxide. Nitrogen was passed through the solution until the excess sulfur dioxide had been removed. The solution was then treated with 9.7 ml. of 25% aqueous sodium hydroxide solution and an aqueous solution containing 4.8 g. of cupric sulfate pentahydrate in 25 ml. of water. The mixture was heated on a steam bath for about 30 minutes and filtered while hot. The precipitate was washed with dioxane and water until the filtrate came through clear. Combined filtrate and washings were acidified with aqueous hydrochloric acid and the acidic mixture was extracted with ether. The ether extract was dried over magnesium sulfate and concentrated in vacuo to remove the ether. The residue was crystallized from methanol to yield 1.0 g. of 3-(10-cyclopropyldecyl) - 2-hydroxy - 1,4 - naphthoquinone, M.P. 79–80° C.

(4) 3-(9 - cyclopropylnonyl) - 2 - hydroxy-1,4-naphthoquinone, M.P. 80–81° C., 6.9 g., was prepared following the procedure described in Example B–3 successively using: 6.5 g. of 3-(10-cyclopropyldecyl)-2-hydroxy-1,4-naphthoquinone, 50 ml. of water, 2.13 g. of sodium carbonate, 50 ml. of dioxane and 3.6 g. of 30% hydrogen peroxide; 3.6 ml. of concentrated hydrochloric acid and 22 ml. of water saturated with sulfur dioxide; 36 ml. of 25% sodium hydroxide solution and 89 ml. of aqueous solution containing 17.8 g. of cupric sulfate pentahydrate; and, recrystallization from n-hexane-n-pentane.

(5) 3 - (8 - cyclopropyloctyl) - 2-hydroxy-1,4-naphthoquinone, M.P. 72–74° C., 2.7 g., was prepared as in Example B–4 successively using: 3.8 g. of 3-(9-cyclopropylnonyl)-2-hydroxy-1,4-naphthoquinone, 30 ml. of water, 1.3 g. of sodium carbonate, 30 ml. of dioxane and 2.2 ml. of 30% hydrogen peroxide; 2.2 ml. of concentrated hydrochloric acid and 13 ml. of water saturated with sulfur dioxide; and, 22 ml. of 25% aqueous sodium hydroxide solution and 55 ml. of water containing 11 g. of cupric sulfate pentahydrate.

Other 3 - (cyclopropylalkyl) - 2 - hydroxy-1,4-naphthoquinones are prepared by following the procedure described in Example B–3 using a corresponding molar equivalent quantity of the corresponding higher adjacent homologous 3-(cyclopropylalkyl)-2-hydroxy-1,4-naphthoquinone, as follows: 3-(7-cyclopropylheptyl)-2-hydroxy-1,4 - naphthoquinone using 3 - (8-cyclopropyloctyl)-2-hydroxy - 1,4-naphthoquinone; 3-(6-cyclopropylhexyl)-2-hydroxy-1,4-naphthoquinone using 3-(7-cyclopropylheptyl)-2 - hydroxy - 1,4-naphthoquinone; and, 3-(11-cyclopropylundecyl) - 2-hydroxy-1,4-naphthoquinone using 3-(12-cyclopropyldodecyl)-2-hydroxy-1,4-naphthoquinone.

(6) 2 - (10-cyclopropyldecyl)-1,4-naphthoquinone [by direct oxidation of 2-(10-cyclopropyldecyl)-1-naphthol]: To a solution of 6.5 g. of 2-(10-cyclopropyldecyl)-1-naphthol in 50 ml. of acetic acid is added dropwise with stirring over a period of fifteen minutes a solution of 8.0 g. of chromium trioxide in 8 ml. of acetic acid and 10 ml. of water allowing the temperature of the reaction mixture to rise to about 50–55° C. during the addition. The reaction mixture is stirred for seventeen hours at room temperature (35° C.) and poured into 300 ml. of water, whereupon some crystalline product separated immediately. The mixture is cooled to about 15° C. and the precipitate collected and recrystallized from methanol to yield 2-(10-cyclopropyldecyl)-1,4-naphthoquinone.

Following the above procedure of Example B–6 but using a molar equivalent quantity of the appropriate 2-(cyclopropylalkyl)-1-naphthol in place of 2-(10-cyclopropyldecyl)-1-naphthol, there are obtained the following 2 - (cyclopropylalkyl) - 1,4-naphthoquinones: 2-(8-cyclopropyloctyl)-1,4-naphthoquinone using 2-(8-cyclopropyloctyl) - 1-naphthol; 2-(9-cyclopropylnonyl)-1,4-naphthoquinone using 2-(9-cyclopropylnonyl)-1-naphthol; 2-(11-cyclopropylundecyl) - 1,4 - naphthoquinone using 2-(11-cyclopropylundecyl)-1-naphthol; 2-(12-cyclopropyldodecyl)-1,4-naphthoquinone using 2-(12-cyclopropyldodecyl)-1 - naphthol; 2-(7-cyclopropylheptyl)-1,4-naphthoquinone using 2-(7-cyclopropylheptyl)-1-naphthol; and, 2-(6-cyclopropylhexyl) - 1,4 - naphthoquinone using 2-(6-cyclopropylhexyl)-1-naphthol.

(7) 2 - (10-cyclopropyldecyl)-1,4-naphthoquinone-2,3-oxide: To a suspension of 7.7 g. of 2-(10-cyclopropyldecyl)-1,4-naphthoquinone, 1.3 g. of potassium hydroxide in 20 ml. of water, and 100 ml. of tertiary butanol is added 7.7 ml. of 30% hydrogen peroxide and the mixture is stirred at room temperature for one hour. The mixture is poured into two volumes of water, cooled and filtered. The product is washed well with water and then dried at 30° C. in vacuo to yield 2-(10-cyclopropyldecyl)-1,4-naphthoquinone-2,3-oxide.

Following the above-described procedure of Example B–7 using a molar equivalent quantity of the appropriate 2 - (cyclopropylalkyl) - 1,4-naphthoquinone in place of 2 - (10 - cyclopropyldecyl)-1,4-naphthoquinone, there are obtained the following 2-(cyclopropylalkyl)-1,4-napthoquinone - 2,3-oxides: 2-(8-cyclopropyloctyl)-1,4-naphthoquinone-2,3-oxide using 2-(8-cyclopropyloctyl)-1,4-naphthoquinone; 2-(9-cyclopropylnonyl)-1,4-naphthoquinone-2,3 - oxide using 2-(9-cyclopropylnonyl)-1,4-naphthoquinone; 2-(11-cyclopropylundecyl)-1,4-naphthoquinone-2,3-oxide using 2 - (11 - cyclopropylundecyl)-1,4-naphthoquinone; 2-(12-cyclopropyldodecyl)-1,4-naphthoquinone-2,3-oxide using 2 - (12 - cyclopropyldodecyl)-1,4-naphthoquinone; 2 - (7 - cyclopropylheptyl)-1,4-naphthoquinone-2,3-oxide using 2-(7-cyclopropylheptyl)-1,4-naphthoquinone; and, 2 - (6 - cyclopropylhexyl) - 1,4 - naphthoquinone-2,3-oxide using 2 - (6-cyclopropylhexyl)-1,4-naphthoquinone.

(8) 2 - hydroxy - 3-(10-cyclopropyldecyl)-1,4-naphthoquinone: A 28.8 g. portion of 2-(10-cyclopropyldecyl)-1,4-naphthoquinone-2,3-oxide is added slowly to 150 ml. of concentrated sulfuric acid while maintaining the temperature at about 5° C. The mixture is allowed to warm up to room temperature. After the solution becomes homogeneous, it is poured into a mixture of 200 g. of ice and 600 ml. of glacial acetic acid. The mixture is heated on a steam bath for one hour, then cooled and filtered. The product is treated with decolorizing charcoal while recrystallizing from methanol to yield 2-hydroxy-3-(10-cyclopropyldecyl)-1,4-naphthoquinone.

Following the above procedure of Example B-8 using a molar equivalent quantity of the appropriate 2-(cyclopropylalkyl)-1,4-naphthoquinone-2,3-oxide, there are obtained the following corresponding 3-(cyclopropylalkyl)-2 - (hydroxy) - 1,4-naphthoquinones: 3-(8-cyclopropyloctyl)-2-hydroxy-1,4-naphthoquinone using 2-(8-cyclopropyloctyl) - 1,4 - naphthoquinone-2,3-oxide; 3-(9-cyclopropylnonyl) - 2 - hydroxy-1,4-naphthoquinone using 2-(9-cyclopropylnonyl)-1,4-naphthoquinone-2,3-oxide; 3-(11-cyclopropylundecyl) - 2 - hydroxy-1,4-naphthoquinone using 2-(11 - cyclopropylundecyl) - 1,4-naphthoquinone-2,3-oxide; 3 - (12 - cyclopropyldodecyl) - 2-hydroxy-1,4-naphthoquinone using 2 - (12 - cyclopropyldodecyl)-1,4-naphthoquinone - 2,3 - oxide; 3-(7-cyclopropylheptyl)-2-hydroxy-1,4-naphthoquinone using 2-(7-cyclopropylheptyl)-1,4-naphthoquinone - 2,3 - oxide and, 3-(6-cyclopropylhexyl)-2-hydroxy-1,4-naphthoquinone using 2-(6-cyclopropylhexyl)-1,4-naphthoquinone-2,3-oxide.

(9) 2 - (10 - cyclopropyldecyl) - 1,4-naphthoquinone [stepwise oxidation via 4-amino-1-naphthol]: A mixture of 23.4 g. of sulfanilic acid and 7.2 g. of sodium carbonate in 135 ml. of water is heated until the materials are in solution. The solution is cooled to about 15° C. and a cold solution of 10.2 g. of sodium nitrite in 27 ml. of water is added. The resulting solution is poured at once into a mixture of 30 ml. of concentrated hydrochloric acid and 160 g. of ice. The reaction is allowed to stand in an ice bath for twenty minutes. In a 2-liter, 3-neck flask 43.7 g. of 2-(10-cyclopropyldecyl)-1-naphthol in 270 ml. of methanol is treated with a solution of 30 g. of sodium hydroxide in 120 ml. of water and the slurry is cooled to 25° C. The suspension of the diazonium salt is then added, using 45 ml. of methanol to wash it in. The resulting purple solution containing 2-(10-cyclopropyldecyl)-4-(4-sulfophenyldiazo)-1-naphthol is stirred for twenty minutes. After heating the solution to 50° C. on a steam bath a slurry of 67.2 g. of sodium hydrosulfite ($Na_2S_2O_4$) in 200 ml. of water is added cautiously and the temperature of the mixture is raised to 80° C. The reaction mixture is stirred for about fifteen minutes without additional heating. The precipitated 4 - amino-2-(10-cyclopropyldecyl)-1-naphthol is collected and washed with water. To oxidize said 4-aminonaphthol, the moist precipitate is suspended in 350 ml. of acetic acid and the suspension is added fairly rapidly to a stirred solution of 30 g. of chromium trioxide ($CrO_3$) in 300 ml. of acetic acid and 60 ml. of water while maintaining the temperature at about 60° C. After five minutes, the mixture is cooled and the precipitate collected. The crystalline 2 - (10 - cyclopropyldecyl)-1,4-dihydro-4-imino-1-oxonaphthalene chromate salt is placed in a desiccator overnight. The imine salt is hydrolyzed by dissolving it in 250 ml. of hot acetic acid and adding 250 ml. of concentrated hydrochloric acid to the solution. After cooling, the reaction mixture is poured into 500 ml. of water and the resulting precipitate is collected and recrystallized from absolute ethanol to yield 2-(10-cyclopropyldecyl)-1,4-naphthoquinone.

A preferred modification of the above-described procedure is the oxidation of the 4-aminonaphthol as its sulfate salt, said modification being illustrated as follows: To a solution (cooled to 20° C.) containing 1.4 liters of water, 700 ml. of concentrated sulfuric acid, 4.1 liters of acetic acid and 415 g. of chromium trioxide is added, with external cooling, a slurry of 4-amino-2-(10-cyclopropyldecyl)-1-naphthol [obtained as above through the diazo compound from 607 g. of 2 - (10 - cyclopropyldecyl)-1-naphthol] in four liters of acetic acid whereupon the temperature of the reaction mixture rises to about 45° C. The reaction mixture is then heated on a steam bath; after the temperature reaches about 87° C., six liters of water are added to the reaction mixture which is then cooled to 8° C. The resulting crystalline precipitate is collected, washed with a total of six liters of water, and dried at room temperature in vacuo to yield 2-(10-cyclopropyldecyl)-1,4-naphthoquinone.

Following the above-described procedures of Example B-9, preferably the latter, starting with a molar equivalent quantity of the appropriate 2-(cyclopropylalkyl)-1-naphthol instead of 2-(10-cyclopropyldecyl)-1-naphthol, there are obtained the following 2-(cyclopropylalkyl)-1,4-naphthoquinones: 2 - (8-cyclopropyloctyl)-1,4-naphthoquinone using 2-(8-cyclopropyloctyl)-1-naphthol; 2 - (9 - cyclopropylnonyl) - 1,4 - naphthoquinone using 2-(9-cyclopropylnonyl) - 1 - naphthol; 2-(11-cyclopropylundecyl)-1,4-naphthoquinone using 2-(11-cyclopropylundecyl)-1-naphthol; 2 - (12 - cyclopropyldodecyl)-1,4-naphthoquinone using 2 - (12-cyclopropyldodecyl)-1-naphthol; 2-(7-cyclopropylheptyl)-1,4-naphthoquinone; and 2-(6-cyclopropylhexyl)-1,4-naphthoquinone.

(10) 3 - (6 - cyclopropylhexyl)-2-hydroxy-1,4-naphthoquinone was prepared as in Example B-1 using 34.0 g. of 7-cyclopropylheptanoyl chloride in 200 ml. of ether, 20 g. of 90% hydrogen peroxide and 16 g. of pyridine to prepare bis(7-cyclopropylheptanoyl)peroxide which was then reacted as in Example B-1 with 30 g. of 2-hydroxy-1,4-naphthoquinone in 200 ml. of acetic acid at 95–100° C. The product was crystallized from n-pentane and recrystallized once from methanol to yield 4.2 g. of 3-(6-cyclopropylhexyl) - 2 - hydroxy-1,4-naphthoquinone, M.P. 75–76° C.

(11) 3 - (7 - cyclopropylheptyl)-2-hydroxy-1,4-naphthoquinone, M.P. 71–73° C., 0.7 g., was prepared as in Example B-3 successively using: 1.8 g. of 3-(8-cyclopropyloctyl)-2-hydroxy-1,4-naphthoquinone, 15 ml. of water, 0.65 g. of sodium carbonate, 15 ml. of dioxane and 1.1 ml. of 30% hydrogen peroxide; 1.1 ml. of concentrated hydrochloric acid and 6.5 ml. of water saturated with sulfur dioxide; 11 ml. of 25% sodium hydroxide solution and 28 ml. of water containing 5.5 ml. of cupric sulfate pentahydrate; and, two recrystallizations from methanol.

The antimalarial activity of the compounds of the invention was established by determining their efficacy against blood-induced *Plasmodium berghei* infections in Swiss mice. The NK-65 strain of *Plasmodium berghei* and female Swiss mice weighing 20±2 grams were used in these determinations. The mice were infected intraperitoneally with a saline-diluted inoculum containing $5 \times 10^6$ parasitized red blood cells; the infected blood was obtained by intra-cardiac puncture of mice with a five to seven day-old infection of *P. berghei*. Since many erythrocytes are invaded by more than one parasite, the average number of parasites injected into each mouse was approximately $1 \times 10^7$. For each test, ten mice were infected but untreated to serve as infection controls. The compound was weighed and homogenously suspended in 10% gelatin so that each daily dose was prepared in a volume of 0.4 cc. The first day's dose was administered orally via stomach tube immediately after inoculation of the infected blood. For each of the next three days, the compound was administered in two equal doses (0.2 cc. each) at 8:00 a.m. and 4:00 p.m. On the fourth post-infection (p.i.) day, a drop of blood obtained from the tail vein of each surviving mouse was placed on a slide and a thin smear prepared, fixed and stained with Giemsa. The slides were examined under oil for parasites and parasitemia was recorded as the number of parasites per 10,000 erythrocytes. Many additional fields were inspected in smears where no parasites were found in 2500 erythrocytes. Three groups of mice were tested at two-fold dosage levels. If mice were cleared of parasites on the fourth day at the lowest level tested, the compound was retested for evaluation at lower dosages. On the basis of the number of mice cleared of parasites on the fourth p.i. day, the effective dose for fifty percent of the animals ($ED_{50}$) for each compound was calculated by the logarithmic-probit method of Miller and Tainter [Pro. Soc. Exper. Biol. & Med. 57, 261–264 (1944)], thus providing for the compound its suppressive effect on blood-induced *P. berghei* infection in mice. When tested by the above-described procedure, the 3-(cyclopropylalkyl)-2-hydroxy-1,4-naphthoquinones of the invention were found to have suppressive antimalarial activity having $ED_{50}$ values in the range of about 10 to 50 ml./kg./day for four days.

The actual determination of the numerical biological data definitive for a particular compound is readily obtained according to the above standard test procedure, by technicians versed in chemotherapeutical test procedures, without any need for any extensive experimentation.

In the above-described procedure the route of administration of the compound is oral, which is the preferred route; however, other routes of administration conventional for antimalarial chemotherapy can be used, e.g., subcutaneous, intravenous, intramuscular. The 3-(cyclopropylalkyl)-2-hydroxy-1,4-naphthoquinones of the invention for oral use can be conveniently prepared either in dry form or in the form of a solution or suspension in a suitable liquid vehicle. In dry form said naphthoquinones can be incorporated with granulating and tableting agents, e.g., starch, calcium carbonate, talc, gelating, acacia, magnesium stearate, etc., and formulated in unit dosage form as tablets, Alternatively, they can be formulated in powder form either alone or in combination with one or more inert diluents, e.g., talc, starch, lactose, sucrose, etc., and, if desired, put into gelatin capsules. Formulations for parenteral use, when desired, can be readily prepared by incorporating in a suitable liquid vehicle one of said 3-(cyclopropylalkyl)-2-hydroxy-1,4-naphthoquinones. Formulations comprising a 3-(cyclopropylalkyl)-2-hydroxy-1,4-naphthoquinone of the invention can, if desired, be supplemented by the addition of one or more other antimalarial agents, for example, chloroquine, hydroxychloroquine, primaquine, pyrimethamine, chlorguanide, sulfametin, quinine, and the like.

The subject matter which the applicant regards as his invention is particularly pointed out and distinctly claimed as follows:

1. 3 - [cyclopropyl - $(CH_2)_n$]-2-hydroxy-1,4-naphthoquinone where $n$ is an integer from 6 to 12 inclusive.
2. 3 - (6 - cyclopropylhexyl)-2-hydroxy-1,4-naphthoquinone according to claim 1 where $n$ is 6.
3. 3 - (7 - cyclopropylheptyl)-2-hydroxy-1,4-naphthoquinone according to claim 1 where $n$ is 7.
4. 3 - (8 - cyclopropyloctyl) - 2-hydroxy-1,4-naphthoquinone according to claim 1 where $n$ is 8.
5. 3 - (9 - cyclopropylnonyl) - 2-hydroxy-1,4-naphthoquinone according to claim 1 where $n$ is 9.
6. 3 - (10 - cyclopropyldecyl) - 2-hydroxy-1,4-naphthoquinone according to claim 1 where $n$ is 10.
7. 3 - (11-cyclopropylundecyl)-2-hydroxy-1,4-naphthoquinone according to claim 1 where $n$ is 11.
8. 3 - (12-cyclopropyldodecyl)-2-hydroxy-1,4-naphthoquinone according to claim 1 where $n$ is 12.
9. A process for preparing 3-[cyclopropyl-$(CH_2)_n$]-2-hydroxy-1,4-naphthoquinone where $n$ is an integer from 6 to 11 inclusive, according to claim 1, which comprises successively oxidizing under alkaline conditions with hydrogen peroxide and then with a cupric salt 3-[cyclopropyl-$(CH_2)_n$]-2-hydroxy-1,4-naphthoquinone where $n$ is an integer from 7 to 12, respectively, where $n$ for the final product is one integer less than that for the starting material.

References Cited

UNITED STATES PATENTS 3,393,211   7/1968   Fisher et al. _____ 260—396

OTHER REFERENCES

Fieser, L. F. et al.: Organic Chemistry (3rd edtn.), 1956, pub. by Reinhold Pub. Corp., New York, pages 715, 716 and 719 relied on.

CHARLES B. PARKER, Primary Examiner

L. A. THAXTON, Assistant Examiner

U.S. Cl. X.R.

260—413, 485, 468, 514, 544, 593, 610, 624, 632, 941

UNITED STATES PATENT OFFICE
CERTIFICATE OF CORRECTION

Patent No. 3,578,685        Dated May 11, 1971

Inventor(s) Sydney Archer

It is certified that error appears in the above-identified patent and that said Letters Patent are hereby corrected as shown below:

Column 2, line 12, "patened" should read --patented--. Column 3, line 33, "$(CH_2)_x=C(=O)]$" should read -- $(CH_2)_x-C(=O)]$ --; line 33, "were" should read --where--; line 70, "10°C." should read --110°C.--; line 74, delete "-1" (first occurrence). Column 4, line 68, between "93.4" and "of" insert -- g. --. Column 5, line 10, "120-130°" should read --120-130°C.--; line 31, between "49.8" and "of" insert -- g. --. Column 6, line 70, "concentraetd" should read --concentrated--. Column 7, line 70, delete "is" (first occurrence). Column 8, line 57, "calicum" should read --calcium--; line 62, "-4-" should read -- -1,4- --. Column 9, line 12, "voume" should read --volume--. Column 13, line 26, between "tablets" and "Alternatively" change the comma to a period.

Signed and sealed this 11th day of April 1972.

(SEAL)
Attest:

EDWARD M. FLETCHER, JR.
Attesting Officer

ROBERT GOTTSCHALK
Commissioner of Patents